Patented Nov. 5, 1935

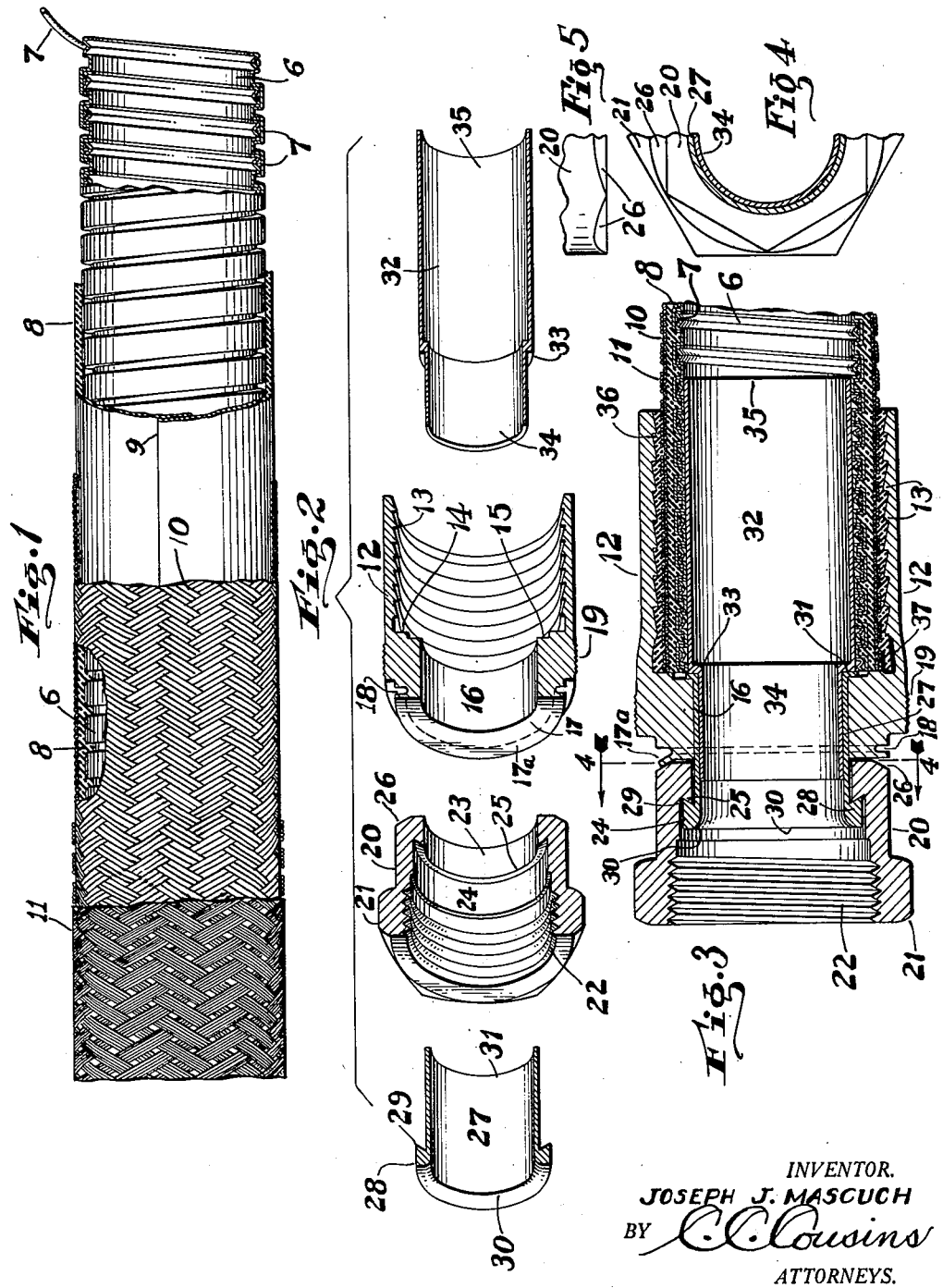

2,019,540

UNITED STATES PATENT OFFICE 2,019,540

FLUID CONDUIT

Joseph J. Mascuch, Newark, N. J.

Application June 6, 1933, Serial No. 674,482

10 Claims. (Cl. 285—84)

This invention relates to a fluid conduit and the method of making the same.

In airplane practice a great deal of trouble has been experienced with gasoline and oil lines. Many serious accidents have occurred because of leaks which develop in gasoline and oil lines. Under normal operating conditions the gasoline and oil lines are subjected to heavy stresses.

Where rigid metal conduits are used the intense, continuous vibration soon causes fatigue and crystallization of the metal, resulting in a breakdown. Where rubber or fabric conduits are used the vibration and extreme range of temperatures encountered, together with the internal pressure and deteriorating effect of gasoline, soon causes a breakdown with resultant leakage. When a leak occurs there is danger of accident. Therefore, the broad object of this invention is to provide a gasoline or oil line which will not leak.

Under existing conditions gasoline or other fuel and oil lines on airplanes have to be frequently replaced. Due to the stresses and the danger of breakdowns they are replaced more often than other parts of the airplanes. This is also true of conduits carrying fluid under pressure such as the conduits for hydraulic brakes, retractable landing gear, etc. This causes additional overhauling and expense. Therefore, the specific object of this invention is to provide a fluid conduit which will withstand without leakage the stresses of vibration, temperature change, internal pressure, chemical action of gasoline and other stresses presented in use on airplanes, and which will continue to function efficiently as long as or longer than the other parts of an airplane.

In many fuel lines the breakage occurs at the point where the conduit enters the coupling member because the stresses are localized at this point. While a specific conduit may be relatively liquid proof and a specific coupling made relatively liquid proof, unless the ensemble will withstand the stresses set up, the fuel or other line will be a failure. Therefore, a further specific object of the invention is to provide a fuel or oil line consisting of the combination of a liquid proof conduit and liquid proof coupling members on the ends thereof, wherein the coupling members will be so connected to the conduit that there can be no localization of stresses.

A further specific object of the invention is to provide a flexible fuel line, the metal elements of which will be in electrical contact and the outside of which will act as a conductor to absorb and ground any electrical impulses which might interfere with radio equipment on an airplane.

The invention consists of the combination, construction, arrangement of parts and method of manufacture, as herein illustrated, described and claimed.

In the accompanying drawing, forming part hereof, is illustrated one form of embodiment of the invention, in which drawing similar reference characters designate corresponding parts and, in which:

Figure 1 is a plan view, in section, showing the structure of a flexible conduit;

Figure 2 is a composite perspective view showing the parts of a coupling member separated in longitudinal section;

Figure 3 is a longitudinal section showing the parts assembled;

Figure 4 is a detail in vertical section taken approximately on line 4—4 of Figure 3, looking in the direction indicated by the arrow; and, Figure 5 is a fragmentary detail in plan.

Referring to the drawing, 6 designates a metal hose forming the inside of a conduit. The hose 6 is formed of a single strip of metal spirally wound or spun upon itself to provide a flexible tube having interlocking flanges. The tube 6 may be made of a light metal such as aluminum or an aluminum alloy, and in the manufacture thereof a packing 7 is introduced between the overlapping flanges so as to render the tube 6 relatively fluid-tight by itself.

Around the inner tube 6 is disposed a covering of resilient material 8. The material 8 is a coal-tar derivative having a phenol base. It has the appearance and resiliency, and insulating qualities of rubber, but has many advantages over rubber in that it is impervious to the action of gasoline, oil or water and will not dry, crack or otherwise break down with long exposure. The material 8 is applied to the tube 6 in sheets and the edges of the sheets overlap at 9. A braiding of fabric 10 is then disposed over the tube 6 with the covering 8. When in this condition the conduit is subjected to heat which causes the material 8 to become soft and flow into the spaces between the flanges of the tube 6 as shown in the broken-away portion on the left-hand side of Figure 1.

At the same time the braiding 11 is impregnated with the material 8 and is in effect vulcanized thereto so that the braiding 10 and material 8 form a homogeneous mass. When the material 8 has been introduced between the flanges of the tube 6 the material 8 acts as a damper to absorb vibration and prevents friction and wear between sections of the tube 6. At the same time it decreases the bending radius or flexibility of the tube 6 so as to prevent sharp bends with resulting localizations of stresses and breakdowns in use.

The outside of the conduit is covered with a braiding of wire 11. The wire braid 11 serves to protect the fabric 10 from abrasion and other wear and at the same time serves as an electrical conductor to absorb and ground through the connected parts any electrical impulses which may interfere with radio equipment. It has been found that the hydro-static pressures create electrical disturbances.

On each end of the conduit formed as above described is disposed a coupling member. The coupling member comprises a sleeve 12 provided with internal teeth 13. The sleeve 12 is provided with an internal shoulder 14 adjacent the teeth 13 and a second reduced shoulder 15 adjacent the shoulder 14. A bore 16 is provided in the sleeve 12 having an end wall 17 provided with a peripheral flange 17a produced by cutting a groove or recess 18 in the sleeve 12 adjacent the end wall 17. A portion 19 of the sleeve 12 is knurled so that the sleeve 12 may be held by hand or with a tool.

Adjacent the end wall 17 of the sleeve 12 is disposed a coupling nut 20 provided with the usual angular faces 21 for engagement by a wrench. The nut 20 is provided with interior screw-threads 22 adapted to engage a threaded member to which the gasoline or oil line may be connected. The end 20 is provided with a bore 23 slightly larger than the bore 16 in the sleeve 12. Adjacent the bore 23 is a recessed wall 24 provided with an acute angled lip 25. The edge of the nut 20 adjacent the wall 17 is provided with a champfer 26 for the purpose hereinafter described.

The members 12 and 20, which are preferably made of a relatively soft metal such as an aluminum alloy, are held together by a thimble 27 made of a relatively hard metal such as steel. Where steel and aluminum are used there is a great difference in electrical potential between the metals. In order to prevent electrolytic action between the steel and aluminum, the steel may be plated with zinc, cadmium or other suitable metal to reduce the difference in potential between the aluminum and steel. The thimble 27 is of a diameter to pass loosely through the bore 23 of the nut 20 and to fit very closely into the bore 16 in the sleeve 12. The thimble 27 is provided with an annular flange 28 on one end, which flange 28 is provided with an acute angled lip 29, the edge of which is relatively sharp. The angle of the lip 29 on the thimble 27 corresponds to the angle of the lip 25 on the wall 24 of the nut 20. The inside edge of the flange 28 may be rounded as shown at 30, or may be made square or angular to suit the particular connection to which the nut 20 will be screwed. In the assembly the end 31 of the thimble 27 opposite the flange 28 is distorted as hereinafter described.

Disposed inside of the coupling member is a reinforcing tube 32 provided with an external shoulder 33 and a reduced extension 34. The diameter of the extension 34 is such that it will fit very tightly within the thimble 27. The opposite end 35 of the tube 32 extends past the end of the sleeve 12 for the purposes hereinafter described.

When the parts are assembled a sleeve 36 of the same material as material 8 heretofore described, is introduced between the wire braid 11 and the inside of the sleeve 12. The sleeve 36 performs the function of preventing friction between the sleeve 12 and the braid 11 caused by relative movement or vibration. By reason of the sleeve 36 being disposed between the braid 11 and the sleeve 12, in order to make electrical contact between the sleeve 12 and the braid 11 a U-shaped piece of flat wire 37 is introduced over the end of the sleeve 36 at any point around its circumference so as to maintain the wire 11 and sleeve in electrical contact or bond.

In the assembly of the device the coupling elements are assembled before being applied to the conduit. The thimble 27 is passed through the bore 23 of the nut 20 and forced through the bore 16 of the sleeve 12. When this has been done the lip 29 of the thimble 27 will lie in the recess formed by the wall 24 and the lip 25 of the nut 20. The bore 23 of the nut 20 being slightly larger than the external diameter of the thimble 27, the nut 20 will be free to rotate on the thimble 27, while the thimble 27 is frictionally held in the bore 16 of the sleeve 12. In order to maintain the thimble 27 in position the inner edge 31 thereof is bent over the internal shoulder 15 of the sleeve 12 thus permanently securing the thimble 27 in position.

The re-inforcing tube 32 is now introduced into the coupling and the extension 34 is pressed into the thimble 27. The shoulder 33 on the tube 32 abuts the edge 31 of the thimble 27 which has been turned against the shoulder 15 of the sleeve 12. There being a relatively tight fit between the extension 34 and the thimble 27, the shoulder 33 of the tube 32 will prevent any possible dislocation of the edge 31 from its proper position. The inner edge 35 of the re-inforcing member 32 extends past the end of the sleeve 12 for the purpose hereinafter described.

When a section of conduit has been fabricated as described a sleeve 36 is disposed over the end thereof and the wire connecting element 37 disposed over the end of the sleeve 36. This assemblage is then introduced between the sleeve 12 of the coupling member and the re-inforcing tube 32. The conduit and the sleeve 36 surrounding it are passed into the sleeve 12 until the end of the conduit abuts the internal shoulder 14 of the sleeve 12. When the parts are in this position that portion of the sleeve 12 which surrounds the conduit is swaged or otherwise reduced in size to securely grip the conduit. The re-inforcing tube 32 will prevent the conduit from collapsing so that the elements of the conduit and the sleeve 36 will be compressed between the members 12 and 32. In compressing the sleeve 36 heat is not applied as is done with the covering 8. When the completed ensemble is connected to an outlet the nut 20 will be tightened to make a fluid-proof connection between the edge 30 of the thimble 27 and the corresponding part of the member to which the line is connected.

When the member 20 is tightened the lip 29 on the thimble 27 will be forced into the angular recess formed by the wall 24 and the lip 25 of the member 20. Since the thimble 27 is made of relatively hard metal and the member 20 is made of relatively soft metal, the lip 29 will cut into the recess into which it engages and will make a fluid-tight joint between the thimble 27 and the member 20 regardless of whether a fluid-tight joint is secured at the edge 30 of the thimble 27. In addition to making a fluid-tight joint, the angle of the lip 29 prevents the spreading outwardly of the member 20 when under pressure. If the lip 29 and the lip 25 were normal to the axis of the coupling, the pressure on the lip 25 would tend to force open or distort the nut 20. However, by making the lips at an acute angle the pressure applied to the nut 20 tends to force the lip 25 inward toward a central point, thus preventing any spreading or distortion of the nut 20.

When the nut 20 has been tightened into its proper position the flange 17a of the end wall 17 of the sleeve 12 may be bent opposite one or more of the champfers 26 on the end of the nut 20, as shown on the upper portion of Figure 3. In this way the flange 17a serves to lock the nut 20 against casual rotation and to maintain the nut 20 in position so that it may not be loosened by vibration. When it is desired to remove the member 20 the flange 17a may be bent back so that the member 20 may be removed, and when it is reconnected the same or another portion of the flange 17a may be bent to hold the member securely in position.

It will be noted that the edge 35 of the re-inforcing tube 32 extends past the end of the sleeve 12. This structure prevents the localization of stress on the conduit at the end of the sleeve 12. Depending upon the length of the gasoline or oil line the edge 35 may extend a greater or less distance past the end of the sleeve 12. The conduit portion of the device is flexible and the coupling portion is rigid. Where the re-inforcing tube 32 extends merely to the end of the coupling the vibrations set up in the flexible conduit are suddenly cut short at the point where the conduit enters the coupling. This results in rapid deterioration and breakdown. By extending the re-inforcing member 32 past the end of the sleeve 12 there is no focal point for the vibrations. Where a long length of conduit is used the vibrations are greatest at the center or free portion. Vibrations are reduced toward the ends, and in the ends of a long conduit the edge 35 of the re-inforcing member 32 will extend further past the end of the sleeve 12, in order to give a greater distance on the conduit to absorb the vibrations, so that they cannot localize at the end of the sleeve 12.

Having thus fully described the invention, what is claimed as new and desired to be secured by Letters Patent is:

1. A leakproof fluid conduit comprising a flexible central conduit having coupling members on the ends thereof, each of said coupling members comprising a sleeve to surround the end portion of the conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, and a re-inforcing member held by the inner wall of the tubular member and extending inside of the sleeve.

2. In combination with a conduit a coupling member comprising a sleeve to surround the end portion of the conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, and a re-inforcing member held by the inner wall of the tubular member and extending inside of the sleeve.

3. A conduit coupling means comprising a sleeve to surround the end portion of a conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, and a re-inforcing member held by the inner wall of the tubular member and extending inside of the sleeve, said re-inforcing member extending past the end of the sleeve and adapted to prevent localization of stress at the end of the sleeve.

4. A conduit coupling means comprising a sleeve to surround the end portion of a conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, a re-inforcing member held by the inner wall of the tubular member and extending inside of the sleeve and a resilient cushion between the sleeve and the conduit to prevent friction therebetween.

5. A conduit coupling means comprising a sleeve to surround the end portion of a conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, a re-inforcing member held by the inner wall of the tubular member and extending inside of the sleeve, said re-inforcing member extending past the end of the sleeve and adapted to prevent localization of stress at the end of the sleeve and a resilient cushion between the sleeve and the conduit to prevent friction therebetween.

6. A conduit coupling means comprising a sleeve to surround the end portion of a conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, a re-inforcing member held by the inner wall of the tubular member and extending inside of the sleeve and means on the sleeve to prevent casual rotation of the securing member.

7. A conduit coupling means comprising a sleeve to surround the end portion of a conduit, a securing member adjacent the sleeve and rotatable with relation thereto, a tubular element disposed through the securing member and extending into the sleeve, the inner end of said tubular member being secured to the sleeve and the outer end being provided with a flange adapted to engage the securing member to hold the same to the sleeve, a re-inforcing member held by the inner wall of the tubular member and extending inside of the sleeve and means on the sleeve to prevent casual rotation of the securing member comprising an annular lip on the sleeve adapted to be forced over a portion of the securing member.

8. A conduit coupling means comprising a sleeve to surround the end of a conduit, a securing member adjacent the sleeve, said securing member being provided with a recess having a wall at an angle to the longitudinal axis of the securing member, a tubular element disposed through the securing member and secured inside the sleeve, said tubular element being provided with an annular flange having one wall recessed to provide an angular lip adapted to lie in the recess adjacent the angular wall of the securing member.

9. A conduit coupling means comprising a sleeve to surround the end of a conduit, a securing member of relatively soft metal adjacent the sleeve, said securing member being provided with a recess having a wall at an angle to the longitudinal axis of the securing member, a tubular element of relatively hard metal disposed through the securing member and secured inside the sleeve, said tubular element being provided with an annular flange having one wall recessed to provide an angular lip having a relatively sharp edge adapted to lie in the recess adjacent the angular wall of the securing member, said edge of said angular lip being adapted to cut into the securing member at the base of the angular wall thereof to form a fluid-tight connection.

10. A conduit coupling means comprising a sleeve to surround the end of a conduit, a securing member adjacent the sleeve, said securing member being provided with a recess having a wall at an angle to the longitudinal axis of the securing member, a tubular element disposed through the securing member and secured inside the sleeve, said tubular element being provided with an annular flange having one wall recessed to provide an angular lip adapted to lie in the recess adjacent the angular wall of the securing member and a re-inforcing member inside the sleeve and conduit and extending into the tubular element.

JOSEPH J. MASCUCH.